United States Patent
Löschky et al.

(10) Patent No.: US 7,152,055 B2
(45) Date of Patent: Dec. 19, 2006

(54) METHOD AND SYSTEM FOR REDUCING DOCUMENT FILE SIZE BY DELETING UNUSED AND DUPLICATE TEMPLATE DATA

(75) Inventors: Dieter Löschky, Hamburg (DE); Bettina Haberer, Hamburg (DE)

(73) Assignee: Sun Microsystems, Inc., Santa Clara, CA (US)

( * ) Notice: Subject to any disclaimer, the term of this patent is extended or adjusted under 35 U.S.C. 154(b) by 415 days.

(21) Appl. No.: 09/728,557

(22) Filed: Nov. 30, 2000

(65) Prior Publication Data

US 2001/0013045 A1  Aug. 9, 2001

(30) Foreign Application Priority Data

Dec. 14, 1999 (EP) .................. 99124948

(51) Int. Cl.
 *G06F 17/30* (2006.01)
(52) U.S. Cl. .................. 707/2; 707/1; 707/7
(58) Field of Classification Search ............ 707/1, 707/3, 5, 7, 10, 100, 103, 104.1, 200, 502, 707/509, 513; 717/108, 143, 166; 358/286, 358/1.18, 1.19; 395/200
See application file for complete search history.

(56) References Cited

U.S. PATENT DOCUMENTS

| | | | |
|---|---|---|---|
| 4,463,386 A * | 7/1984 | Goddard et al. | 358/426.12 |
| 5,898,836 A * | 4/1999 | Freivald et al. | 709/218 |
| 5,970,496 A | 10/1999 | Katzenberger | 707/102 |
| 6,023,706 A * | 2/2000 | Schmuck et al. | 707/200 |
| 6,088,708 A * | 7/2000 | Burch et al. | 715/509 |
| 6,530,080 B1 * | 3/2003 | Fresko et al. | 717/166 |
| 6,557,017 B1 * | 4/2003 | Venable | 707/502 |
| 6,574,636 B1 * | 6/2003 | Balon et al. | 707/103 |
| 6,583,890 B1 * | 6/2003 | Mastie et al. | 358/1.18 |
| 6,585,777 B1 * | 7/2003 | Ramaley et al. | 707/100 |

FOREIGN PATENT DOCUMENTS

EP  0 805 402 A2  5/1997

OTHER PUBLICATIONS

IBM Technical Disclosure Bulletin—TDB-ACC-NO: NB9203435—Mar. 1992, U.S., "Converting Paper Documents to Electronic Images with Automatic Document Recognition, Index Generation and Template Removal".*

* cited by examiner

*Primary Examiner*—Jeffrey Gaffin
*Assistant Examiner*—Neveen Abel-Jalil
(74) *Attorney, Agent, or Firm*—Gunnison, McKay & Hodgson, L.L.P.; Forrest Gunnison

(57) ABSTRACT

A computer generated document file comprises content data and template data including, for example, formatting information. The size of the document file is reduced by removing unused and/or duplicate template data.

21 Claims, 4 Drawing Sheets

METHOD AND SYSTEM FOR REDUCING DOCUMENT FILE SIZE BY DELETING UNUSED AND DUPLICATE TEMPLATE DATA

BACKGROUND OF THE INVENTION

1. Field of the Invention

The present invention relates generally to reducing the file size of a computer generated document file, and more particularly to reducing the file size of a document file containing content data and template data.

2. Background of the Invention

The use of templates is common practice for the generation of a document on a computer. Documents, like text documents, graphics documents, presentation documents or HTML-documents, contain user defined content data or dynamic data as well as template data from the template used. The combination of the content data with the template data forms the finished, formatted document, which can be used for printout, presentation or a web page.

FIG. 1A illustrates schematically a document file 100 including content data 110A and 110B and template data 111, as for example, formatting data. Document file 100 may be, for example, a user document comprising, as content data, user defined data like text 110A or graphics 110B. Template data 111 is any predetermined data related to the document for determining particular features of the document. Template data 111 may be, for example, formatting data like style templates defining paragraph, object, character, or frame styles.

FIG. 1B shows a different example of a document containing content data and template data. Content data 120 is contained in a foreground or dynamic page 120 and the template data is contained in a background page 125, which may also contain elements, like a logo, an address, an account number or a URL, which are used identically in a plurality of dynamic pages.

Every background page contains an identifier, which allows the identification of the same. The identifier may be a certain name, number, a combination of the two, or any other appropriate means. Every dynamic page, which refers to one or more background pages, contains a reference field comprising the identifier of the employed background page. A combination of the dynamic page with the background page forms, in this example, a finished, formatted document object. An example of a page template is a background page containing formatting information and an empty dynamic page.

When a document is generated usually data objects of a plurality of sources are inputted or copied into the document file. In these cases, not only the content data but also the template data, containing for example formatting information, are copied into the document file thus created. Over time, template data may accumulate in the document file and increase the size of the document file even though the template data are no longer used.

Moreover, in creating a new document, often another document is used as a starting point, which also includes template data. These template data may be not necessary in the new document.

SUMMARY OF THE INVENTION

In accordance with the present invention the above problem has been solved by a method of reducing the file size of a document file comprising content data and template data, the method comprising removing unused and/or duplicate template data from the document file.

With the method according to the present invention, the document file size can be reduced considerably. Although, the cost of memory has dropped dramatically large document files may be inconvenient on mobile devices as laptops or palmtops and tend to increase data transfer times, e.g., over the Internet. A reduced file size is particularly important for web pages because download times can be reduced.

The removal of unused and/or duplicate template data from the document file is carried out, in one embodiment, in response to a user instruction, which the user may enter in response to a request by the program. Further, unused data referenced by removed unused template data are also removed to further reduce the document file size.

The operation of removing multiple and/or unused template data can be carried out directly before saving the document file. The operation of removing duplicate template data, however, may also be carried out after a new data object containing template data is imported or copied to the document file. Moreover, unused template data may be detected and removed immediately after content data is deleted. The content data may include user definable content including text, graphics, spreadsheets, or tables.

The template data may include formatting data like page, paragraph, object, character or frame style templates. The template data, however, may also include a background page containing, for example, a logo, address data or the like. The document file may be any type of file including a HTML- or XML-document.

One embodiment of the present invention provides a computer program for reducing the file size of a document file comprising content data and template data, the computer program having program code adapted for removing unused and/or duplicate template data from the document file.

Program code may be embodied in any form of a computer program product. A computer program product comprises a medium configured to store or transport computer readable code, or in which computer readable code may be embedded.

Another embodiment of the invention provides an apparatus for reducing the file size of a document file comprising content data and template data stored on a storage medium, the apparatus comprising processing means for removing unused and/or duplicate template data from the document file.

In still another embodiment of the present invention, unused or duplicate template data, which may contain formatting data, graphics or other memory space consuming elements, are removed from the document file. This reduces the overall data volume. With the invention, memory space and transfer time and costs can be saved. On the other hand, the present invention assures that no useful data is removed from the document file.

BRIEF DESCRIPTION OF THE DRAWINGS

In the drawings and the following detailed description, elements with the same reference numeral are the same element. Also, the first digit of a reference numeral represents the first figure in which that element appeared.

DETAILED DESCRIPTION

Method 230 of this invention reduces a document file size by storing only currently used content data, formatting information, or other information that is needed to create the document in file 236 on memory 211. Any information that is unused or duplicative is deleted and not stored in file 236.

Figure 3:
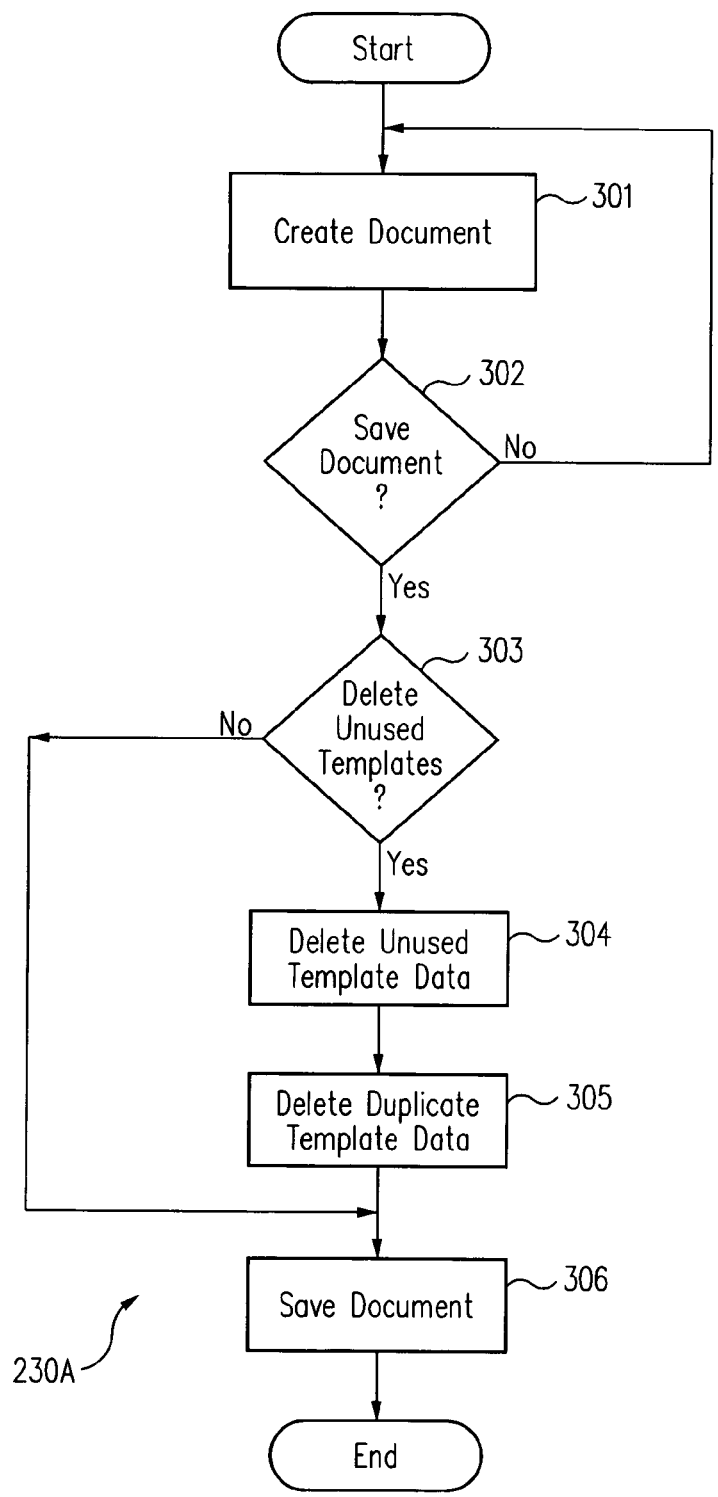
FIG. 3 is a process flow diagram illustrating a first embodiment of the present invention.

FIG. 3 is a process flow diagram of a first embodiment 230A of method 230. In create document file operation 301, a user opens an application 232 and then creates a document 235 using application 232. Application 232, typically, includes formatting data in the new document in the form of a template. Alternatively, the user may use application 232 to open an existing document that includes a template and content data.

The user inputs content data into document 235 using standard input devices like a keyboard 215 or speech processing software and/or hardware. The user also may import or copy data from other sources and paste the same into document 235. When the user imports a data object from a different source to document 235, the template data contained in the imported data object is then also transferred into document 235.

Save document check operation 302 determines whether the user has issued an instruction to save document 235 as a document file 236 on a storage medium 211. If the user gives such an instruction, method 230 proceeds to delete unused templates check operation 303, and otherwise returns to operation 301.

Delete unused templates check operation 303 generates a dialogue window on display screen 295 in which the user is asked whether the user wishes to delete unused templates. If the user does not want to delete unused templates, check operation 303 transfers to save document operation 306 that is described below.

If the user, however, wishes to delete unused templates, check operation 303 transfers processing to delete unused template data operation 304. In operation 304, application 232 detects and deletes template data, which are not used in document 235. Unused template data are, for example, templates, which are not employed directly or indirectly by the content data in document 235. These unused templates can be detected through their identifiers, which are not referred to in the content data.

Upon completion of operation 304, processing transfers to delete duplicate template data operation 305. In operation 305, document 235 is checked to determine whether duplicate templates are contained in document 235 and these are subsequently removed from document 235. Operation 305 transfers to save document operation 306.

Save document operation 306 writes document 235 to storage medium 211 as document file 236. If the user elects to delete unused and/or duplicate template data, the file size of document file 236 is considerably reduced.

In this example, it was assumed that application 232 with method 230, document 235, and document file 236 were all on computer system 200. However, this is illustrative only and is not intended to limit the invention to this specific configuration. As explained more completely below, application 232 and method 230 could be executed on another computer system 280 that is coupled by a network 203, 204 to computer system 200. Computer system 200 could be used only to display information and to provide input data and instructions.

A second embodiment 230B of the present invention is explained in connection with the process flow diagram of FIG. 4. After opening document 235 using application 232 in open document operation 411, object import check operation 412 determines whether the user is copying or importing an object containing template data into document 235.

If the user carries out such a copying or importing operation, check operation 412 transfers to identical template data check operation 413 and otherwise to content deleted check operation 417. Identical template data check operation 413 determines whether identical template data are already contained in document 235. If identical template data are already contained in document 235, processing transfers to delete duplicate template data operation 305 and otherwise transfers processing to check operation 412.

In operation 305, the duplicate template data is removed from document 235, as described above, and processing transfers to check operation 412. If the user does not import or copy an object into document 235, processing transfers through check operation 412 to content deleted check operation 417.

Content deleted check operation 417 determines whether the user has issued an instruction to delete content from document 235. If the user has issued such an instruction, check operation 417 transfers to unused template data check operation 418 and otherwise to close document check operation 415.

Unused template data check operation 418 determines whether there is template data associated with the deleted content that is not employed by any other content data contained in document 235, i.e., whether there is unused template data as result of the content deletion. If there is unused template data, check operation 418 transfers to delete unused template data operation 304, that was described above, and otherwise to check operation 412. After delete unused template data operation 304 deletes the unused template data, operation 304 also transfers processing to check operation 412.

If the user has completed the document and issued a command to close the document, check operation 415 transfers to save document operation 416 and otherwise transfers to check operation 412. Save document operation 416 writes document 235 to document file 236 and this ends method 230B.

With method 230B, the user can then continue the work to complete the document. Unnecessary template data are immediately deleted. Consequently, the storage required for processing document 235 is minimized at all times.

Figure 4:
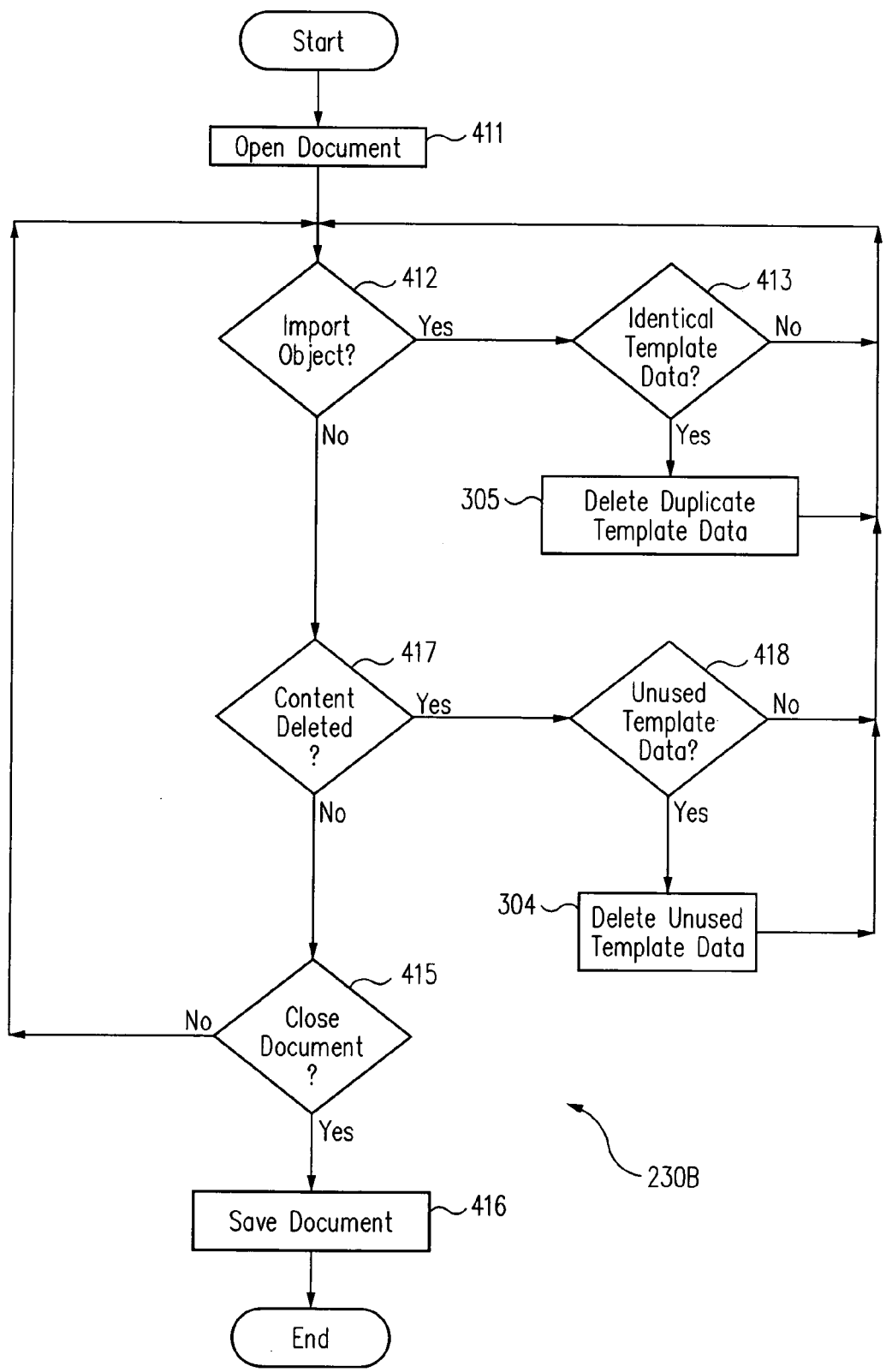
FIG. 4 is a process flow diagram illustrating a second embodiment of the present invention.

In FIGS. 3 and 4, the process flow diagram was illustrated and described sequentially. This is illustrative only and is not intended to limit the invention to the sequence shown. Typically, in a windowing environment, when a user initiates an event, such as importing an object, deleting content, saving, or closing a document, an event handler receives the user input and directs the input data to the appropriate routine that processes the event. In FIG. 4, for example, check operations 412, 415, and 417 would be separate events that are checked by the event handler. Consequently, the particular way that processes 230A and 230B are implemented is not essential to this invention, and will depend upon the application or applications used, the computer operating system, the network operation system and so forth.

In the above example, when a document file was opened and being worked on, the document file was shown in a volatile memory and referred to as a document. This was for clarity only and was not intended to limit the invention to the specific configurations illustrated. First, those of skill in the art will appreciate that the document and the document file are both files. Those of skill in the art also know that information in a document file can be accessed directly from a non-volatile memory, from a volatile memory, or any combination of the two.

With the invention, it is possible to considerably reduce the file size of computer created documents by removing unused formatting or template data. The reduction of the file size is particularly important in the case of web pages, the download time of which can be reduced.

Figure 1A:
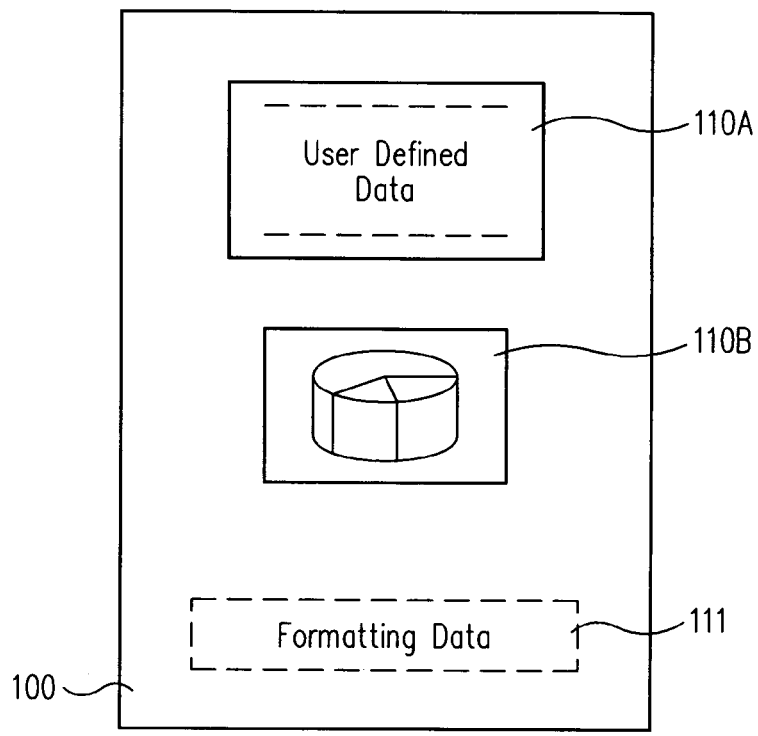
FIG. 1A is a schematic illustration showing a document file comprising content data and template data.
Figure 1B:
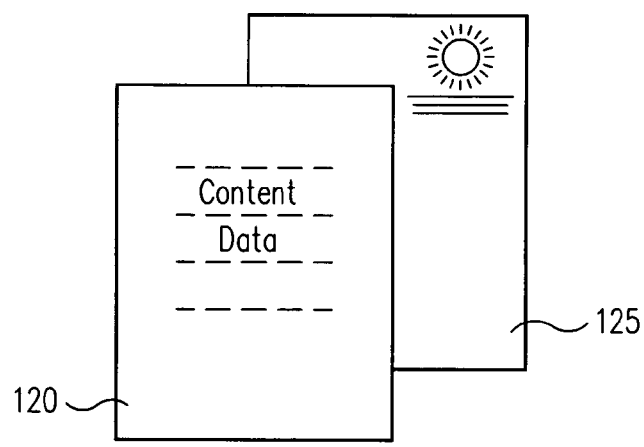
FIG. 1B is a schematic illustration of a page containing content data and an attached background page containing template data.
Figure 2:
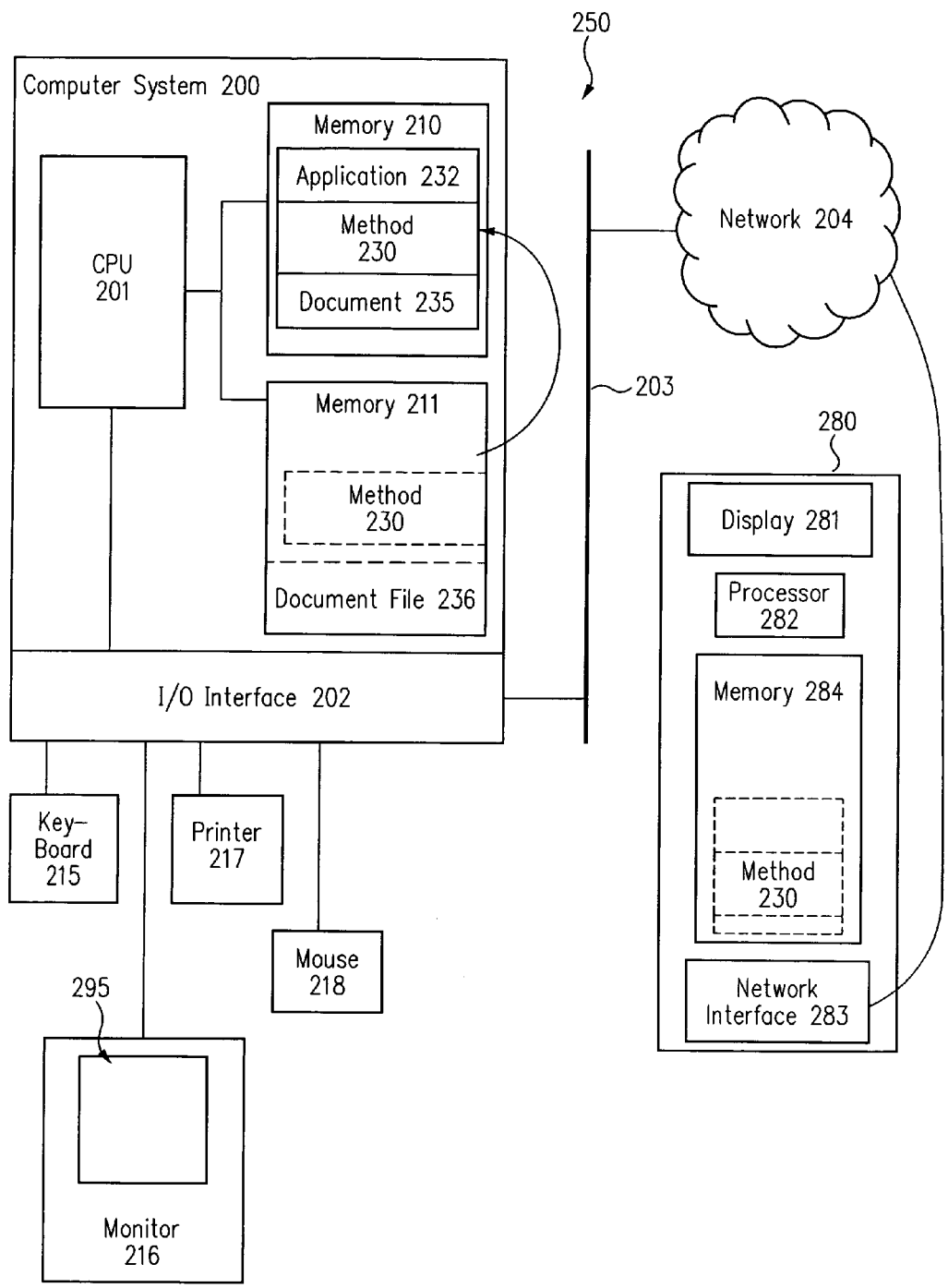
FIG. 2 is a block diagram of a computer system to which the present invention may be applied.

The present invention is applicable to a hardware configuration like a personal computer or workstation as illustrated schematically in FIG. 2 by computer system 200. The invention, however, may also be applied to a client-server configuration 250 that also is illustrated in FIG. 2. The document containing content and template data may be displayed on a display screen of client device 200 while some or all operations of method 230 are carried out on a server computer 280 accessible by the client device 200 over a data network 204, such as the Internet, using a browser application or the like.

Herein, a computer program product comprises a medium configured to store or transport computer readable code for method 230 or in which computer readable code for method 230 is stored. Some examples of computer program products are CD-ROM discs, ROM cards, floppy discs, magnetic tapes, computer hard drives, servers on a network and signals transmitted over a network representing computer readable program code.

As illustrated in FIG. 2, this storage medium may belong to computer system 200 itself. However, the storage medium also may be removed from computer system 200. For example, method 230 may be stored in memory 284 that is physically located in a location different from processor 201. The only requirement is that processor 201 is coupled to the memory containing method 230. This could be accomplished in a client-server system 250, e.g., system 200 is the client and system 280 is the server, or alternatively via a connection to another computer via modems and analog lines, or digital interfaces and a digital carrier line.

For example, memory 284 could be in a World Wide Web portal, while display unit 216 and processor 201 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 200, in one embodiment, can be a portable computer, a workstation, a two-way pager, a cellular telephone, a digital wireless telephone, a personal digital assistant, a server computer, an Internet appliance, or any other device that includes the components shown and that can execute method 230. Similarly, in another embodiment, computer system 200 can be comprised of multiple different computers, wireless devices, cellular telephones, digital telephones, two-way pagers, or personal digital assistants, server computers, or any desired combination of these devices that are interconnected to perform, method 230 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 230 can be implemented in a wide variety of computer system configurations. In addition, method 230 could be stored as different modules in memories of different devices. For example, method 230 could initially be stored in a server computer 280, and then as necessary, a module of method 230 could be transferred to a client device 200 and executed on client device 200. Consequently, part of method 230 would be executed on the server processor 282, and another part of method 230 would be executed on processor 201 of client device 200. In view of this disclosure, those of skill in the art can implement the invention of a wide-variety of physical hardware configurations using an operating system and computer programming language of interest to the user. For example, FIG. 2 shows input devices 215 and 218, but other input devices, such as speech recognition software and/or hardware could be used to input the selections and data for method 230.

In yet another embodiment, method 230 is stored in memory 284 of system 280. Stored method 230 is transferred, over network 204 to memory 211 in system 200. In this embodiment, network interface 283 and I/O interface 202 would include analog modems, digital modems, or a network interface card. If modems are used, network 204 includes a communications network, and method 230 is downloaded via the communications network.

Method 230 of the present invention may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, the present invention also relates to a data carrier for storing a computer program for carrying out the inventive method. The present invention also relates to a method for using a computer system for carrying out the presented inventive method. The present invention further relates to a computer system with a storage medium on which a computer program for carrying out the presented inventive method is stored.

We claim:

1. A method of reducing a size of a document file comprising:
   removing unused template data from the document file, wherein the document file includes content data and template data including said unused template data and used template data;
   said removing unused template data is performed upon content data being removed from the document when the template data are not employed by any other content data contained in the document file; and
   a combination of the content data and the template data forms a finished, formatted document; and
   removing duplicate template data from the document file without taking any further operation related to said, removed duplicate template data; wherein said size of said document file is reduced.

2. The method of claim 1, wherein the method is carried out in response to a user instruction.

3. The method of claim 1 further comprising removing any unused data relating to the unused template data.

4. The method of claim 1 wherein said removing duplicate template data operation is performed upon an object containing template data being imported or copied into the document file when the imported or copied template data duplicates template data already contained in the document file.

5. The method of claim 1, wherein the content data is user definable data including any one of text, graphics, tables, and a database.

6. The method of claim 1, wherein the template data includes formatting data defining any one of a paragraph, object, character, and frame style.

7. The method of claim 1, wherein the template data includes a background page.

8. A computer program product comprising tangible computer readable instructions having embedded therein computer program instructions when executed by a computer generate a method for reducing a size of a document file comprising:
removing unused template data from the document file wherein the document file comprises content data and template data including said unused template data and used template data, said removing unused template data is performed upon content data being removed, from the document when the template data are not employed by any other content data contained in the document filer and a combination of the content data and the template data forms a finished, formatted document; and
removing duplicate template data from the document file without taking any further operation related to said removed duplicate template data; wherein said size of said document file is reduced.

9. The computer program product of claim 8, wherein the method is carried out in response to a user instruction.

10. The computer program product of claim 8, said method further comprising removing any unused data relating to the unused template data.

11. The computer program product of claim 8 wherein said removing duplicate template data operation is performed upon an object containing template data being imported or copied into the document file when the imported or copied template data duplicates template data already contained in the document file.

12. The computer program product of claim 8, wherein the content data is user definable data including any one of text, graphics, tables, and a data base.

13. The computer program product of claim 8, wherein the template data includes formatting data defining any one of a paragraph, object, character, and frame style.

14. The computer program product of claim 8, wherein the template data includes a background page.

15. A system comprising:
a processor; and
a memory coupled to said processor, and having stored therein computer code to perform a method for reducing a size of a document file comprising content data and template data wherein upon execution of said computer code on said processor said method comprises:
removing unused template data from the document file wherein the document file comprises content data and template data including said unused template data and used template data; said removing unused template data is performed upon content data being removed from the document when the template data are not employed by any other content data contained in the document file; and a combination of the content data and the template data forms a finished, formatted document; and
removing duplicate template data from the document file without taking any further operation related to said removed duplicate template data.

16. The system of claim 15, wherein the method is carried out in response to a user instruction.

17. The system of claim 15 wherein said method further comprises removing any unused data relating to the unused template data.

18. The system of claim 15 wherein said removing duplicate template data operation is performed upon an object containing template data being imported or copied into the document file when the imported or copied template data duplicates template data already contained in the document file.

19. The system of claim 15, wherein the content data is user definable data including any one of text, graphics, tables, and a database.

20. The system of claim 15, wherein the template data includes formatting data defining any one of a paragraph, object, character, and frame style.

21. The system of claim 15, wherein the template data includes a background page.

* * * * *

UNITED STATES PATENT AND TRADEMARK OFFICE
CERTIFICATE OF CORRECTION

PATENT NO. : 7,152,055 B2
APPLICATION NO. : 09/728557
DATED : December 19, 2006
INVENTOR(S) : Dieter Löschky and Bettina Haberer It is certified that error appears in the above-identified patent and that said Letters Patent is hereby corrected as shown below:

Column 7, Line 24, Claim 8, between "removed" and "from", delete ",".
Column 7, Line 27, Claim 8, change "filer" to --file;--.

Signed and Sealed this

Twenty-seventh Day of March, 2007

JON W. DUDAS
*Director of the United States Patent and Trademark Office*